(12) United States Patent
Shu et al.

(10) Patent No.: US 12,462,334 B2
(45) Date of Patent: *Nov. 4, 2025

(54) NEURAL RADIANCE FIELDS FOR ORTHOGRAPHIC IMAGERY

(71) Applicant: 1000786269 ONTARIO INC., Toronto (CA)

(72) Inventors: Yuanming Shu, Toronto (CA); Weiguang Ding, Toronto (CA)

(73) Assignee: 1000786269 ONTARIO INC., Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/198,205

(22) Filed: May 5, 2025

(65) Prior Publication Data

US 2025/0322486 A1     Oct. 16, 2025

Related U.S. Application Data

(63) Continuation of application No. 19/052,473, filed on Feb. 13, 2025.

(Continued)

(51) Int. Cl.
*G06T 3/06* (2024.01)
*G06T 3/04* (2024.01)
(Continued)

(52) U.S. Cl.
CPC ............ *G06T 3/06* (2024.01); *G06T 3/04* (2024.01); *G06T 3/4038* (2013.01); *G06T 7/50* (2017.01);
(Continued)

(58) Field of Classification Search
None
See application file for complete search history.

(56) References Cited

U.S. PATENT DOCUMENTS

| 9,984,494 B2 | 5/2018 | Pylvaenaeinen et al. |
| 2014/0307100 A1 | 10/2014 | Myllykoski et al. |

(Continued)

FOREIGN PATENT DOCUMENTS

CA     2402929 A1     9/2001

OTHER PUBLICATIONS

International Search Report and Written Opinion to PCT/CA2025/050185 dated Jun. 16, 2025.

*Primary Examiner* — James A Thompson
(74) *Attorney, Agent, or Firm* — Damian Rolfe

(57) ABSTRACT

Methods and systems for generating orthographic imagery are provided. An example method involves accessing a plurality of source images depicting a scene from multiple points of view, encoding at least some of the source images into corresponding series of multiscale feature maps, receiving a definition of an orthographic projection of the scene, and generating an orthographic image of the scene corresponding to the orthographic projection. The generating involves applying global attention across a set of higher-level features, applying a convolutional and upsampling layer, generating a depth map for the scene, and back-projecting each point on the depth map corresponding to a pixel that should be rendered back through the orthographic projection to determine a set of lower-level features to be used to decode the pixel, and applying local attention across the set of lower-level features to produce a set of decoded features from which pixel information can be determined.

18 Claims, 9 Drawing Sheets

Related U.S. Application Data

(60) Provisional application No. 63/746,311, filed on Jan. 17, 2025, provisional application No. 63/554,620, filed on Feb. 16, 2024.

(51) Int. Cl.
*G06T 3/4038* (2024.01)
*G06T 7/50* (2017.01)

(52) U.S. Cl.
CPC ..... *G06T 2200/32* (2013.01); *G06T 2207/10032* (2013.01); *G06T 2207/20016* (2013.01); *G06T 2207/20221* (2013.01)

(56) References Cited

U.S. PATENT DOCUMENTS

| | | | |
|---|---|---|---|
| 2015/0262335 A1* | 9/2015 | Padwick | G06T 3/4038 345/629 |
| 2021/0279950 A1 | 9/2021 | Phalak et al. | |
| 2023/0186557 A1* | 6/2023 | Palmer | G06T 7/73 345/419 |
| 2025/0037354 A1 | 1/2025 | Shu et al. | |
| 2025/0225668 A1* | 7/2025 | Campagnolo Guizilini | G06T 7/12 |
| 2025/0232461 A1* | 7/2025 | Gaidon | G06T 7/50 |

* cited by examiner

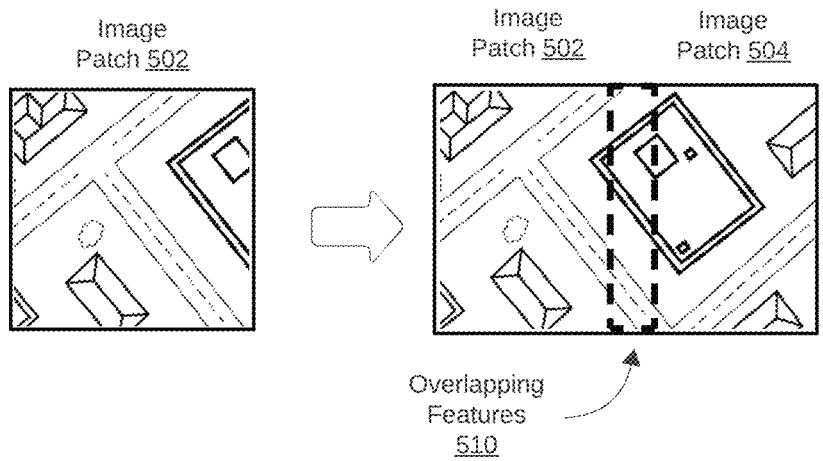
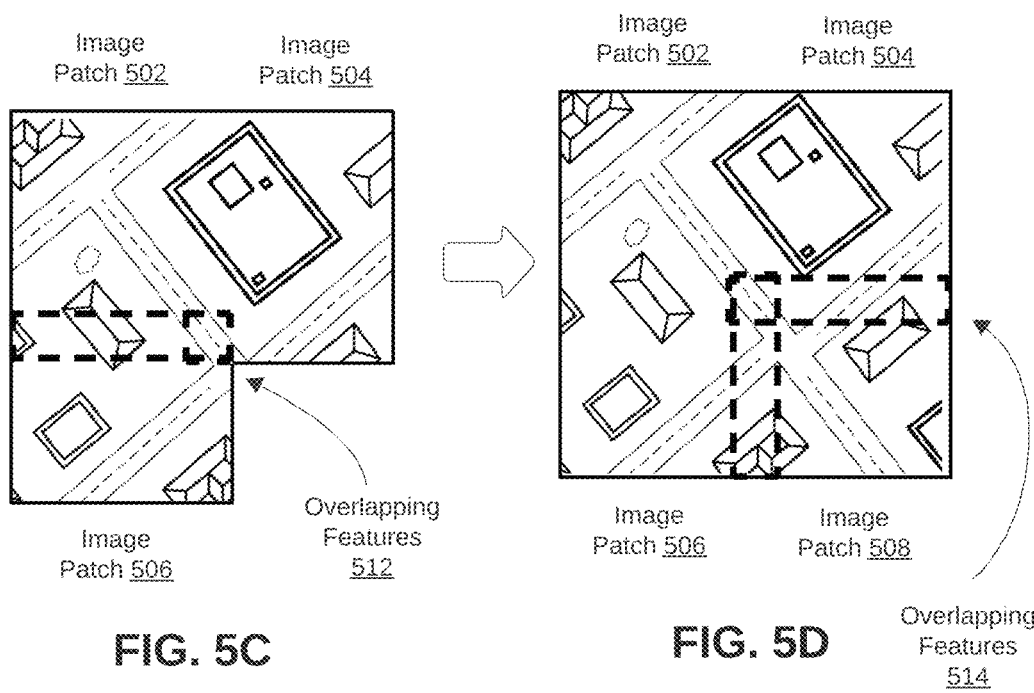
FIG. 5A  FIG. 5B  FIG. 5C  FIG. 5D

NEURAL RADIANCE FIELDS FOR ORTHOGRAPHIC IMAGERY

CROSS-REFERENCE TO RELATED APPLICATIONS

This application claims the benefit under 35 U.S.C. § 120 as a continuation of U.S. patent application Ser. No. 19/052,473, filed Feb. 13, 2025, which claims the benefit under 35 U.S.C. § 119(e) of U.S. Provisional App. 63/746,311, filed Jan. 17, 2025, and U.S. Provisional App. 63/554,620, filed Feb. 16, 2024. The contents of each of the aforementioned applications are incorporated herein by reference in their entirety.

BACKGROUND

Orthographic imagery refers to geospatial imagery that has been geometrically transformed to eliminate distortions caused by terrain and camera characteristics, providing an accurate "top-down" view of the Earth's surface. This correction ensures that the imagery accurately represents the Earth's surface in terms of scale and spatial relationships, making it ideal for mapping.

Typically, orthographic imagery is created by collecting aerial or satellite images and then geometrically correcting them using a digital terrain model (DTM) or digital surface model (DSM). The resulting orthorectified images are often combined to cover larger areas, forming what is known as an orthomosaic.

However, the orthorectification process is not always flawless. Several challenges can arise. First, distortions may occur, particularly in True Digital Ortho Maps (TDOMs), where the accuracy is largely dependent on the quality of the underlying DSM, and where errors in the DSM can lead to inaccuracies in pixel reprojection. Second, orthographic images may contain "holes"—areas with missing pixel information—due to occlusions or excessive shadow coverage. Third, when an orthomosaic is created from images captured under different environmental conditions (e.g., different seasons or varying shadow positions), parts of the orthomosaic may appear inconsistent, with some areas showing clear, shadow-free conditions and others showing snow or shadows.

BRIEF DESCRIPTION OF THE DRAWINGS

FIG. 5A, FIG. 5B, FIG. 5C, and FIG. 5D illustrate an example of a series of image patches being generated through a method for depth map-based novel view synthesis to form an orthomosaic.

DETAILED DESCRIPTION

As described above, the common problems encountered when generating orthographic imagery include pixel reprojection error, missing pixel data, and inconsistent environmental conditions between neighbouring image patches when creating an orthomosaic. This disclosure teaches that these and other issues can be resolved by generating orthographic imagery through depth map-based novel view synthesis.

The method for depth-map based novel view synthesis described herein may be similar to the method disclosed in U.S. patent application Ser. No. 18/769,041, filed Jul. 10, 2024, entitled GENERALIZABLE NOVEL VIEW SYNTHESIS GUIDED BY LOCAL ATTENTION MECHANISM (the "'041 Application"), which is incorporated herein by reference in its entirety. The '041 Application describes a generalizable method for novel view synthesis in which a set of source images of a scene are encoded into a series of multiscale feature maps and a target view of the scene is decoded with reference to this encoded feature information. The image decoding process involves predicting depth information for the scene in progressively finer detail and leveraging this depth information to more efficiently apply attention across only the most relevant feature information extracted from the source images. These ideas are extended here for the particular use case of generating orthographic imagery.

The additional insight in this disclosure is that it may be particularly advantageous to generate orthographic imagery through such a method for novel view synthesis (by defining the camera parameters to be those of an orthographic projection). Thus, rather than using a digital terrain map (DTM) or digital surface map (DSM) to generate an orthographic image by reprojecting pixel information in the conventional manner, the depth information that is generated inherently as part of the method for novel view synthesis can effectively be leveraged as a substitute for the DSM/DTM to generate the orthographic image directly. As a result, the method for generating orthographic imagery described herein does not require the use of an independently captured three-dimensional dataset (i.e., DTM or DSM) which may be a source of potential pixel reprojection error. Furthermore, since the method is based on a generative machine learning model, areas of the scene that lack in pixel information either due to occlusions or shadows (which would typically result in "holes") can be generatively filled based on the surrounding context. Moreover, when generating an orthomosaic, neighbouring image patches can be generated with matching environmental conditions (i.e., lighting, weather), thereby eliminating the problem of inconsistent environmental conditions. These and other aspects of the methods described herein may thereby result in improved orthographic image and orthomosaic generation.

Figure 1:
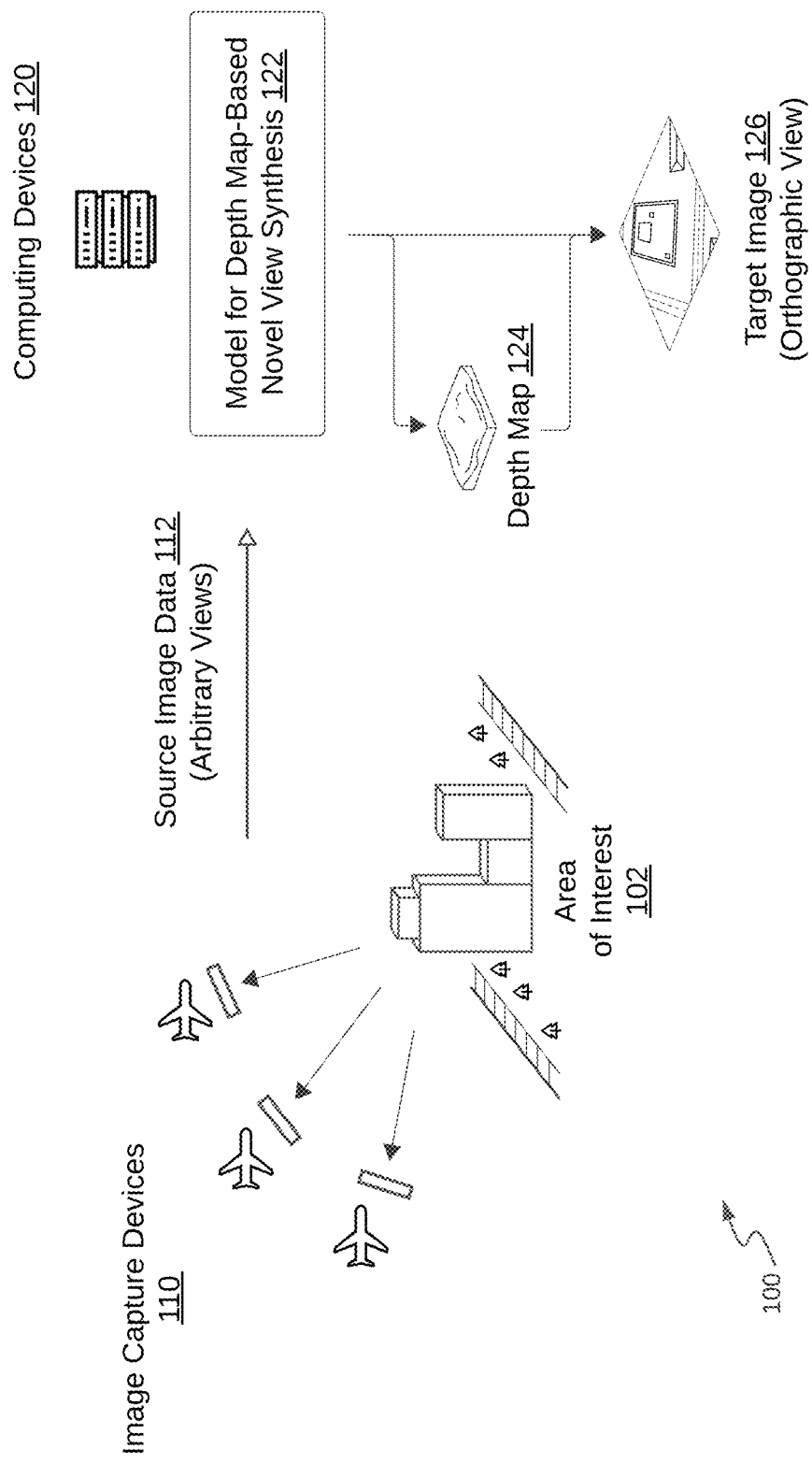
FIG. 1 is a schematic diagram of an example system for generating orthographic imagery through a method for depth map-based novel view synthesis.

FIG. 1 is a schematic diagram of an example system 100 for generating orthographic imagery through such a method for depth map-based novel view synthesis.

The system 100 includes one or more image capture devices 110 for capturing source image data 112 over an area of interest 102. An image capture device 110 may include any suitable sensor (e.g., camera) onboard a satellite, aircraft, drone, observation balloon, or other device capable of capturing imagery over the area of interest 102. In the present example, the image capture devices 110 are depicted as cameras onboard aircraft. The source images may be of urban or rural environments, and may be captured from arbitrary points of view, which may include nadir, off-nadir, and oblique points of view. However, generally speaking, at least some of the source images should be captured from a substantially overhead point of view to enable the accurate synthesis of orthographic imagery.

The source image data 112 may comprise the raw image data captured by such image capture devices 110 along with any relevant metadata, including internal and external camera parameters (e.g., focal length, lens distortion, camera pose, resolution), geospatial projection information (e.g., latitude and longitude position), or other relevant metadata. The source image data 112 may contain one or several batches of imagery, which may have been captured on the same dates or on different dates, under similar or different environmental conditions (e.g., weather, lighting).

The system 100 further includes one or more computing devices 120 to process the source image data 112 to generate synthetic orthographic imagery as described herein. In the present example, the computing devices 120 may include one or more servers or virtual machines in a cloud computing environment comprising one or more processors for executing computing instructions. In other examples, the computing devices 120 may comprise one or more handheld computing devices (e.g., smartphones), laptop or desktop computers, or a combination of any of the above. In addition to processing capabilities, the computing devices 120 include one or more communication interfaces to receive/obtain/access the source image data 112 through one or more computing networks and/or telecommunications networks such as the internet, and to similarly output/transmit any data or generated images. The computing devices 120 further include memory (i.e., non-transitory machine-readable storage media) to store programming instructions that embody the functionality described herein.

The computing devices 120 are configured to run (i.e., store, host or access) a model for depth map-based novel view synthesis 122, which represents one or more programs, software modules, or other set of non-transitory machine-readable instructions, configured to process the source image data 112 to synthesizing one or more target images 126 of the area of interest 102 based on corresponding target views (i.e., orthographic views). As described herein, the model for depth map-based novel view synthesis 122 also produces depth information of the area of interest 102 (i.e., depth map 124) as part of the image synthesis process. These underlying models and processes, which may be similar to those described in the '041 Application, are described in greater detail in FIG. 2 and FIG. 3, below.

The computing devices 120 may be configured to generate target images 126 based on requests received directly from users (e.g., where the computing devices 120 comprise a personal computing device or otherwise includes a user interface capable of receiving definitions/representations/indications of target views), or based on requests received from other devices (e.g., where the computing devices 120 comprise remote servers configured to receive requests from other computing devices through one or more communication networks such as the internet). For the production of orthographic imagery, such requests should define orthographic perspectives of the area of interest 102. In some examples, although not shown, the computing devices 120 may provide guidance, such as through a user interface, to guide the user to input orthographic camera parameters. In any case, requests to generate images may be received through a variety of means, including, for example, through an Application Programming Interface (API), through a user interface accessible through a web browser, mobile application, or other means.

Although not shown, such target images 126 may ultimately be used and displayed at one or more client devices configured to run (i.e., store, host or access) one or more software programs to display, process, or otherwise use the target images 126, which may include a display device through which a user may view the target images 126. In one example, such orthographic imagery may be used by geographic information system (GIS) professionals running software capable of processing such orthographic imagery for the purposes of land use planning and other similar purposes.

In other examples, the orthographic imagery generated herein may be used in further downstream processes such as feature extraction and modeling processes, such as landcover feature extraction processes, including, for example, those described in U.S. patent application Ser. No. 17/731,769, filed Apr. 28, 2022, entitled MACHINE LEARNING FOR VECTOR MAP GENERATION, which is incorporated herein by reference in its entirety.

As will be described in greater detail below, the model for depth map-based novel view synthesis 122 comprises one or more machine learning models arranged in a deep learning architecture. As such, prior to operation (i.e., inference), the model 122 should be trained to generate novel views based on input target points of view. As such, the computing devices 120, or other computing devices, may be used to train the model 122 on a dataset of imagery comprising various scenes and/or areas of interest, and in particular should be trained on sources of imagery and areas of interest common to the geospatial context, including satellite and/or aerial imagery covering large areas of interest including urban and rural areas. Further aspects with respect to the training of such models are disclosed in the '041 Application.

Figure 2:
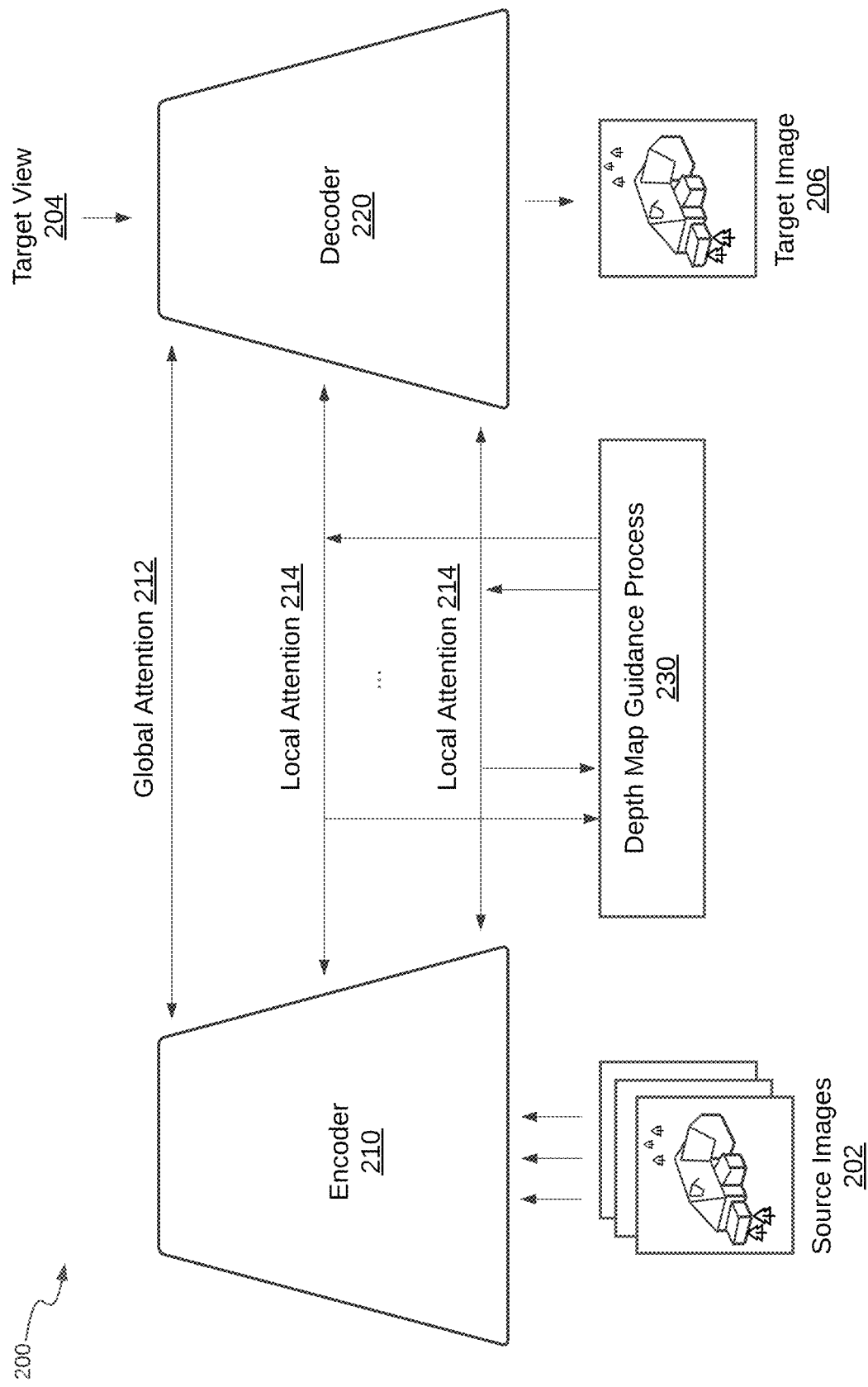
FIG. 2 is a schematic diagram of an example machine learning model for depth map-based novel view synthesis.

FIG. 2 is a schematic diagram of an example machine learning model 200 for depth map-based novel view synthesis. At a high level, the machine learning model 200 comprises an encoder 210 and a decoder 220 arranged in a deep learning architecture.

The encoder 210 is configured to process a plurality of source images 202 captured from multiple points of view, which depict some arbitrary scene to be modeled, to generate at least one respective feature map for each of the source images 202. The encoder 210 may comprise some series of encoder layers, omitted here for simplicity, that progressively encode each source image 202 into a series of feature maps (intermediate feature representations) which tend to increase in number of channels and decrease in resolution (i.e., a series of multiscale feature maps). For example, if a source image 202 is an aerial image captured at native ground resolution 0.25 m, the encoder may encode the aerial image into a series of multiscale feature maps that correspond to features extracted at approximately 0.25 m, 0.5 m, and 1.0 m resolutions. The series of multiscale feature maps for the aerial image culminates in what may be referred to herein as a "final" encoded feature map, which represents the highest-level, lowest-resolution, representation of feature information extracted from the image.

The series of encoder layers may include one or more convolutional layers, one or more self-attention layers, one or more feed-forward neural layers, or any other suitable encoding layers capable of extracting and encoding features from each source image 202, with downsampling layers as appropriate, as feature information is encoded into progressively higher-level feature information (at a lower resolution). The encoder 210 may further include an embedding component that embeds the camera parameters for each source image 202. Camera parameters refer to the internal and/or external parameters used in a camera model to describe the mathematical relationship between the 3D coordinates of a point in the scene to the 2D coordinates of its projection onto an image plane (e.g., whether according to a pinhole camera model, pushbroom camera model, fisheye camera model, orthographic projection, or other camera model). It should be understood that one or more blocks of such components may be arranged in a deep learning architecture.

The decoder 220 is configured to decode a representation of a target view 204, which describes some arbitrary pose relative to the scene, into a target image 206 of the scene. The decoder 220 comprises some series of decoder layers, omitted here for simplicity, that progressively decode a representation of the target view 204 into a series of feature maps (intermediate feature representations) which tend to decrease in the number of channels and increase in resolution (i.e., a series of multiscale feature maps). In keeping with the above example of an aerial image captured at native ground resolution 0.25 m, the decoded series of multiscale feature maps may correspond to the same resolutions of at 1.0 m, 0.5 m, and 0.25 m resolutions, generated in reverse order. Each series of multiscale feature maps for each target view 204 culminates in what may be referred to herein as a "final" decoded feature map for the target view 206, from which the pixel information for the target image 206 (e.g., RGB) can be determined (e.g., by some final activation function).

It should also be noted that the camera parameters that define the target view 204 need not necessarily match the same camera model used to capture the source images 202, as the process for transforming images from one camera model to another can be learned by the decoder 220. For example, the source images 202 may have been captured through a fisheye camera model, whereas the target view 204 may call for a pinhole camera model. Thus, although it may be possible to configure the machine learning model 200 to specialize in particular image transformations (i.e., transform image data capture from pinhole camera models to image data in orthographic projections), since the camera model information is incorporated into encoder 210 (through source images 202) and the decoder 220 (through target views 204), the machine learning model 200 may also be configured to be agnostic as to both the input camera model and the output camera model. As used in the application for generating orthographic imagery, regardless of the camera model of the source images 202, the target view 204 may describe camera parameters for an orthographic view to produce a target image 206 that is an orthographic image.

In terms of architecture, the series of decoding layers included in the decoder 220 may include one or more convolutional layers, one or more self-attention layers, one or more feed-forward neural layers, or any other suitable decoding layers capable of decoding features for the target image 206, with upsampling layers as appropriate, as feature information is decoded into progressively lower-level feature information (at a higher-resolution). The decoder 220 may include an embedding component that embeds camera parameters for the target views 206.

The decoder 220 includes at least one global attention layer, which gives rise to the global attention mechanism 212, and one or more local attention layers, each of which gives rise to a respective local attention mechanism 214. It is through these cross-attention mechanisms that the features of a target image 206 are progressively decoded by attending to feature information encoded from the source images 202. Further, it should be understood that one or more blocks of the above components may be arranged in a deep learning architecture.

As mentioned above, the decoder 220 applies attention over data produced by the encoder 210 through at least one global attention mechanism 212 and one or more local attention mechanisms 214. The global attention mechanism 212 is applied at or near the top of the decoder 220, to attend to the higher-level (i.e., lower resolution) features, where a global attention calculation is relatively computationally inexpensive. Global attention that is applied at the top of the decoder 220 may apply over every feature of the final encoded feature map for each source image 202.

Further down the decoder 220, to attend to the lower-level (i.e., higher resolution) features, where attention calculations are more computationally expensive, the decoder 220 applies a form of local attention that reduces the computational resources required, indicated here as the local attention mechanisms 214. These local attention mechanisms 214 are guided by a depth map guidance process 230 which involves generating a depth map for the scene and leveraging the resulting spatial understanding of the scene into decoding the features of the scene that are visible through the defined target view 204.

In terms of training, the machine learning model 200 may be trained on a dataset comprising a plurality of sets of source images 202 depicting a plurality of scenes, for generalizability. In terms of the objective function, the machine learning model 200 may be trained solely on image loss. The training process would typically involve selecting some of the images of each scene to serve as the ground truth images against which the synthesized images are measured to determine image loss. Therefore, the machine learning model 200 is trained end-to-end in a self-supervised manner without the need for annotated training data. The encoder 210 and decoder 220 may thereby learn to encode the features of the source images 202 and decode a target image 206 in a variety of scenes, including those unseen in the training data. Furthermore, the depth map generation process need not be trained separately, and may be learned implicitly in a self-supervised manner as part of training to decode the target image 206, without the need for annotated training data.

The machine learning model 200, including the trained learned neural network weights, biases, activation functions, and other architectural components and functionality may be embodied in non-transitory machine-readable programming instructions, and executable by one or more processors of one or more computing devices, which include memory to store programming instructions that embody the functionality described herein and one or more processor to execute the programming instructions.

Figure 3:
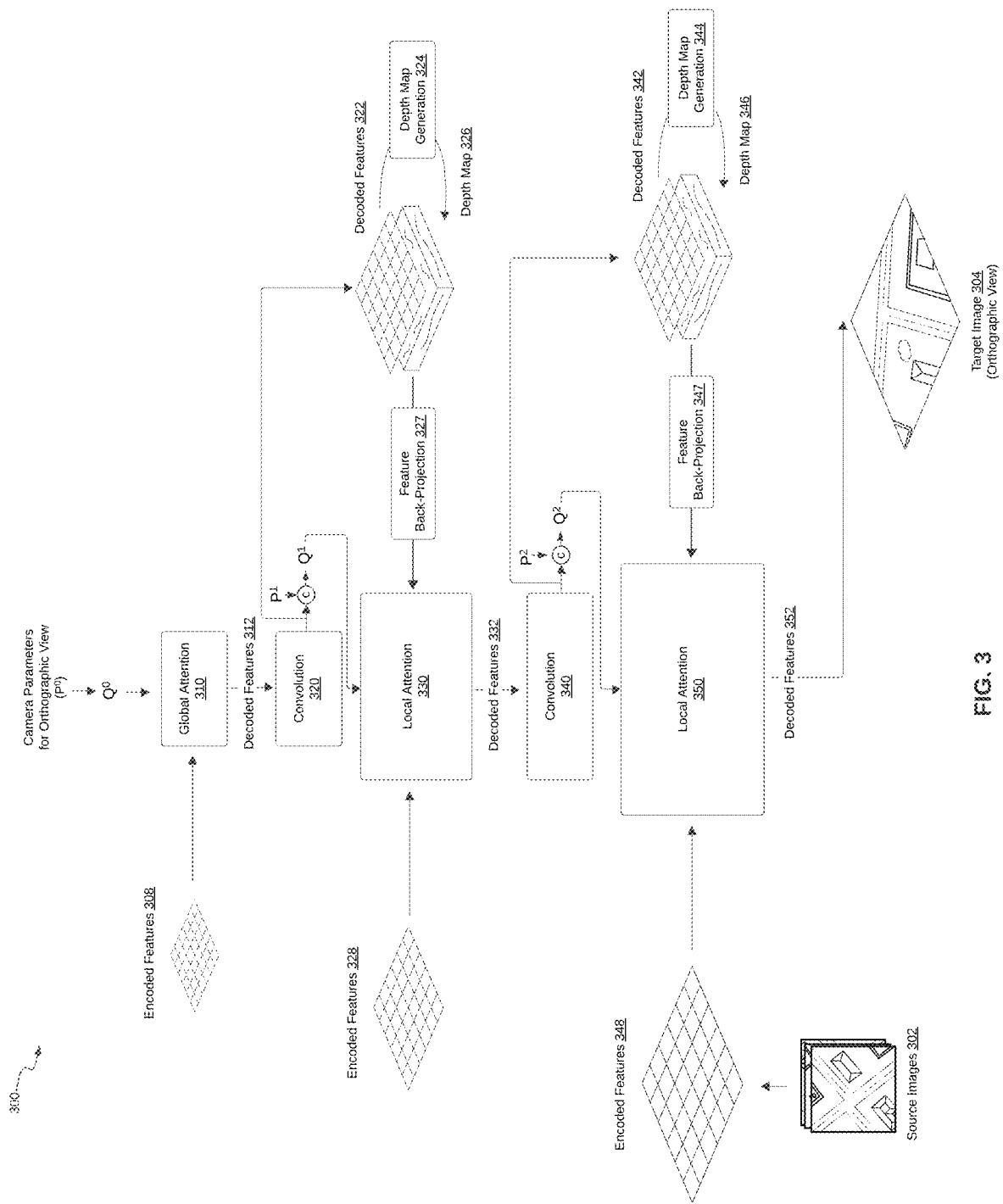
FIG. 3 is a schematic diagram illustrating an example decoder that forms part of an example machine learning model for depth map-based novel view synthesis configured to generate orthographic imagery.

FIG. 3 is a schematic diagram illustrating an example architecture of a decoder 300, which may be similar to the decoder 220 of FIG. 2, shown in greater detail, that forms part of a machine learning model for depth map-based novel view synthesis. Further, FIG. 3 illustrates the flow of features and other information through the decoder 300 as configured for the use case of generating orthographic imagery.

As with the decoder 220 of FIG. 2, the decoder 300 of FIG. 3 includes a series of global attention, convolution, and local attention layers. More specifically, the decoder 300 includes a global attention layer 310, followed by a first convolutional layer 320, followed by a first local attention layer 330, followed by a second convolutional layer 340, which is finally followed by a second local attention layer 350, arranged in a deep learning architecture. This arrangement is provided for example purposes only and it should be emphasized that the architecture could include more or fewer global, convolutional, and local attention layers, and/or additional neural layers, embedding layers, or other architectural features, as appropriate.

To begin, the global attention layer 310 receives a query $Q^0$ that comprises an indication of the camera parameters for a target image 304 to be decoded. In the present example, the query $Q^0$ should define a set of orthographic camera parameters $P^0$. The query $Q^0$ can be an embedded representation of such camera parameters $P^0$ derived through any suitable embedding process. The global attention layer 310 decodes the query $Q^0$ into a first set of decoded features 312 by applying global attention across a first set of encoded features 308 encoded from a set of source images 302. The first set of encoded features 308 comprises the "final" (i.e., lowest resolution) encoded feature maps from each of the source images 302, as described above with respect to FIG. 2. Attention may be computed in any suitable manner, such as performing scaled dot product between cross-attention values (see, e.g., Vaswani, Ashish, et al. "Attention is all you need." *Advances in neural information processing systems* 30 (2017)). The global attention layer 310 determines the most relevant feature information to be extracted from the first set of encoded features 308 based on the particular query $Q^0$. In global attention, the key matrix for the attention calculation may correspond to the entire set of available encoded features (at the appropriate scale) from which feature information may be drawn.

The resulting decoded features 312 pass through the first convolutional layer 320 and are upsampled to produce a second set of decoded features 322 to fuse together the feature information extracted from the previous attention layer into the next level of scale. These decoded features 322 are then used in a depth map generation process 324 to predict a first depth map 326 of the scene from the point of view of the input camera parameters. The depth map generation process 324 may involve any suitable technique such as a combination of convolutional and/or other neural layers to produce a depth map based on the decoded features 322. Although possibly low-resolution at this point, the resulting depth map 326 will aid in future decoding steps, and serves as a structural basis from which feature information that is relevant to the defined orthographic view can be extracted. The depth map 326 is used in a feature back-projection process 327 to determine which of a second set of encoded features 328 from the source images 302 (at the next scale) are to be used in the following local attention layer 330. An illustration of the feature back-projection process 327 is provided in FIG. 4, below.

Figure 4:
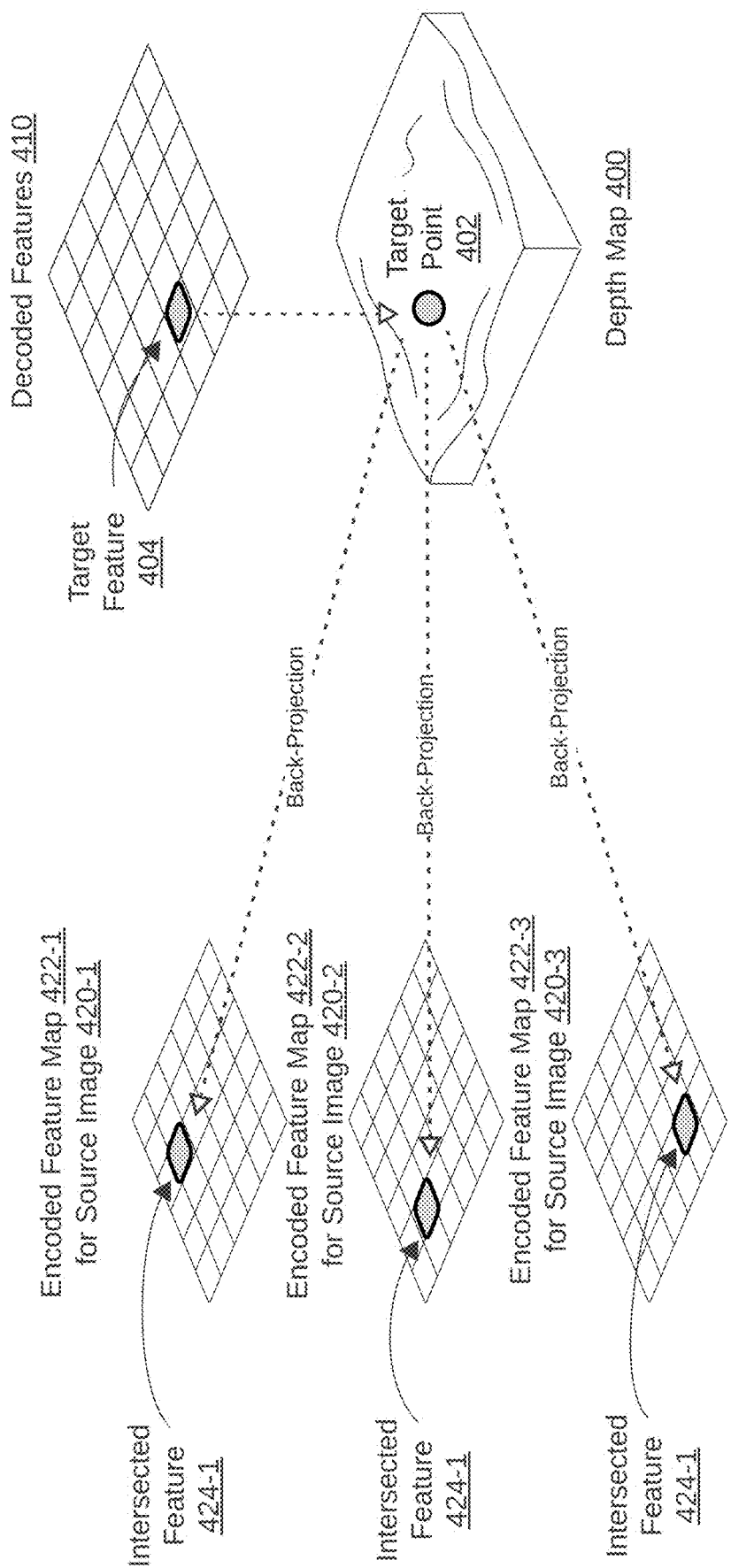
FIG. 4 illustrates an example feature back-projection process that may be involved in a method for depth map-based novel view synthesis.

In FIG. 4, a target point 402 on a depth map 400 is projected back to the encoded feature maps 422 (at the appropriate scale) of each available source image 420. The back-projection may be performed with reference to the appropriate camera model for the particular source image 420 and with reference to the three-dimensional space represented by the depth map 400. The particular encoded features that are intersected by the back-projection (and optionally, a set of surrounding features) can be included in the following local attention calculation. Source images that cannot be projected to (i.e., due to occlusions) can be excluded. Thus, as illustrated, the target point 402 is back-projected to the intersected feature 424-1 (from the encoded feature map 422-1 of source image 420-1), the intersected feature 424-2 (from the encoded feature map 422-2 of source image 420-2), and the intersected feature 424-3 (from the encoded feature map 422-3 of source image 420-3). Additional details on the feature back-projection process may be found in the '041 Application.

Returning to FIG. 3, the local attention layer 330 receives a query $Q^1$ that comprises an indication of the camera parameters $P^1$ for a target image 304 to be decoded (based on $P^0$ upsampled as appropriate) concatenated with the decoded features 322. In contrast with global attention, the key matrix for the local attention calculation may correspond to only the limited set of the encoded features 328 which were determined to be in view through the feature back-projection process 327. This limitation reduces the computational requirements to perform the attention calculations at this higher level of resolution.

The resulting decoded features 332 pass through the second convolutional layer 340 and are upsampled to produce a third set of decoded features 342 to fuse together the feature information extracted from the previous attention layer into the next level of scale. These decoded features 342 are then used in a depth map generation process 344 (similar to 324) to predict a second depth map 346 of the scene (similar to 326, but at higher resolution). As above, the depth map 346 is used in a feature back-projection process 347 (similar to 327) to determine which of the encoded features 348 from the source images 302 (at the next scale) are to be used in the following local attention layer 350.

Finally, the local attention layer 350 receives a query $Q^2$ that comprises an indication of the camera parameters $P^2$ for a target image 304 to be decoded (based on $P^1$ upsampled as appropriate), concatenated with the decoded features 342. As above, the key matrix for the local attention calculation may correspond to only the limited set of the encoded features 348 which were determined to be in view through the feature back-projection process 347.

The resulting decoded features 352 may pass through one or more additional convolutional layers or further neural processing, or may be used directly to decode the target image 304 (e.g., RGB layer), through any suitable activation layer, such as a Softmax function. As described above, since the initial query $Q^0$ defines camera parameters for an orthographic view of the scene, the target image 304 may reflect a true orthographic reprojection of the scene.

As should be seen from the above, since the orthographic reprojection is performed inherently by the decoder 300 through a feature back-projection process which is based on depth information derived from feature information extracted from the source images 302, there is no separate 3D point dataset (e.g., DSM/DTM) that could be a source of pixel reprojection error. Furthermore, since the target image 304 is produced through the generative machine learning process described above, and particularly because the decoder 300 includes convolutional layers to blend together neighbouring feature information throughout the process, any missing pixel data from the source images 302 may be generatively filled in based on the surrounding context (and, where context is inferred at multiple scales). Moreover, because target images 304 are created by a generative machine learning process, these images may be generated with similar environmental contexts (i.e., as defined through the initial query $Q^0$). For example, the query $Q^0$ could also define the sun angle (i.e., time of day) as being favorable to orthographic projection (i.e., at high noon), so as to reduce the occurrence of shadows. Defining similar environmental characteristics may also be advantageous when combining neighbouring target images 304 as image patches into a larger orthomosaic.

As with the machine learning model 200, the decoder 300, including the trained learned neural network weights, biases, activation functions, and other architectural components and functionality, may be embodied in non-transitory machine-readable programming instructions, and executable by one or more processors of one or more computing devices, which include memory to store programming instructions that embody the functionality described herein and one or more processor to execute the programming instructions.

As mentioned previously, an orthomosaic can be created by combining several synthetic orthographic images generated in the manner described herein. As illustrated through FIGS. 5A-5D, the methods described herein also allow for the feature information of each image patch to be incorporated into the generation of each following neighbouring image patch, to produce an exceptional smooth orthomosaic image.

Thus, FIG. 5A shows a first image patch 502, generated in the manner described above. Next, FIG. 5B shows the first image patch 502, followed by a second image patch 504, which is adjacent and at least partially overlapping the first image patch 502. The area of the second image patch 504 that indicated as overlapping features 510 could have been generated by incorporating (as described below in FIGS. 6A-6B) the feature information generated for the first image patch 502. Continuing, FIG. 5C shows the first image patch 502, second image patch 504, and a third image patch 506. Similarly, the area of the third image patch 506 that is indicated as overlapping features 512 could have been generated by incorporating (as described below) the feature information generated for the first image patch 502 and the second image patch 504. Finally, FIG. 5D shows the first image patch 502, second image patch 504, third image patch 506, and a fourth image patch 508. Again, the area of the fourth image patch 508 that is indicated as overlapping features 514 could have been generated by incorporating (as described below) the feature information generated for the first image patch 502, second image patch 504, and third image patch 506.

As mentioned above, FIG. 6A-6B illustrate how the underlying feature information from previously generated image patches can be incorporated into subsequent neighbouring image patches. Thus, FIG. 6A illustrates another example of the decoder 300 of FIG. 3, herein denoted as decoder 600, which includes the same or similar components with analogous numbering, including global attention layer 610, first convolutional layer 620, first local attention layer 630, second convolutional layer 640, and second attention layer 650, and which generates decoded features 612A, 622A, 632A, 642A, 652A, to ultimately produce target image 604A, based on encoded features 608, 628, 648, and source images 602, and which involves depth map generation processes 624, 644 to generate depth maps 626A, 646A, and feature back-projection processes 627, 647.

Figure 6A:
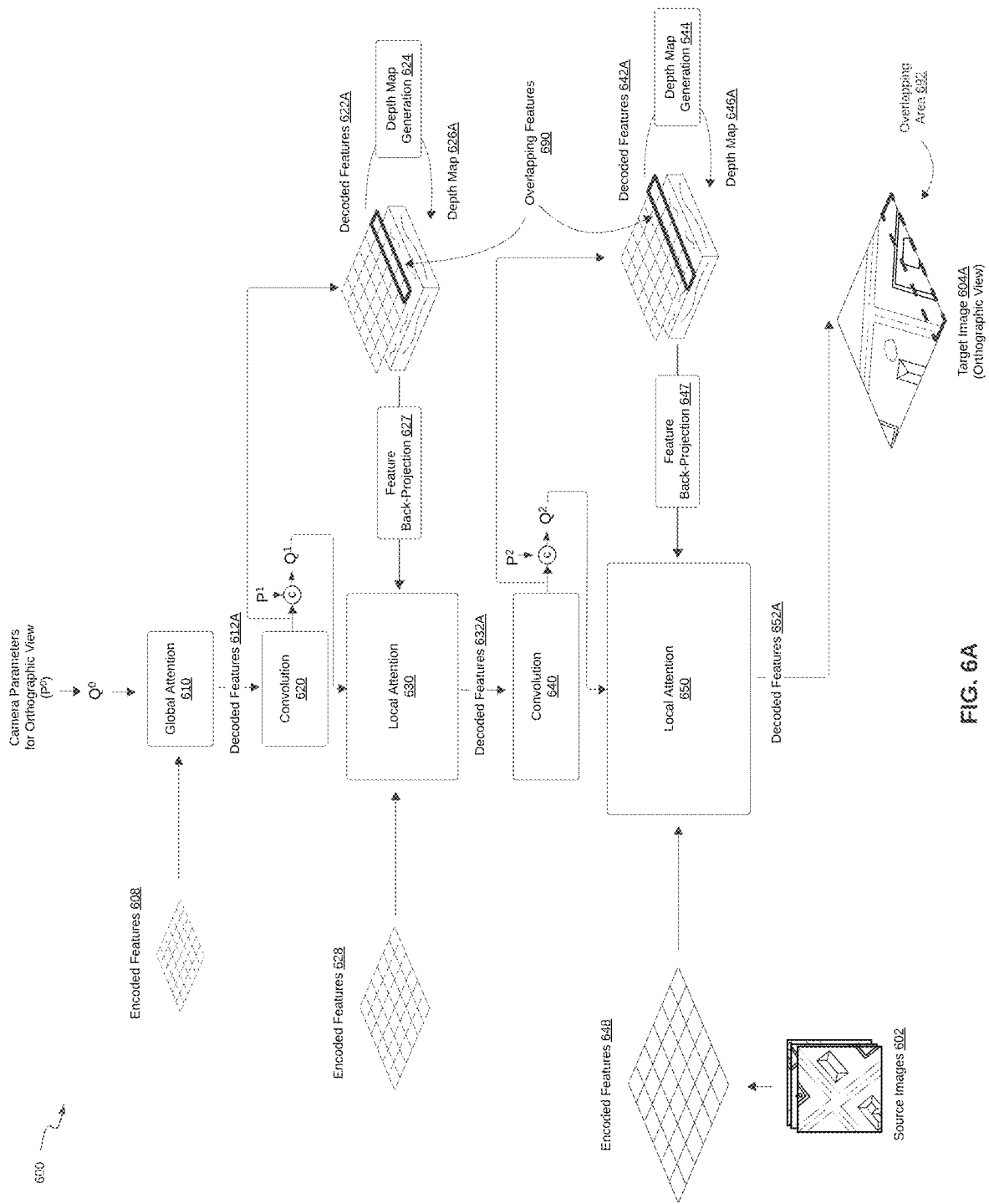
FIG. 6A illustrates the example decoder of FIG. 3 generating the features for a first image patch to be used in an orthomosaic.

FIG. 6A illustrates the decoder 600 in a state of generating a first image patch (indicated as target image 604A) that will form part of an orthomosaic. For illustrative purposes, the portions of the decoded features 622A and 642A that will overlap with the next image patch are indicated as overlapping features 690. Furthermore, the portion of the resulting target image 604A that will overlap with the next image patch is indicated as overlapping area 692.

Figure 6B:
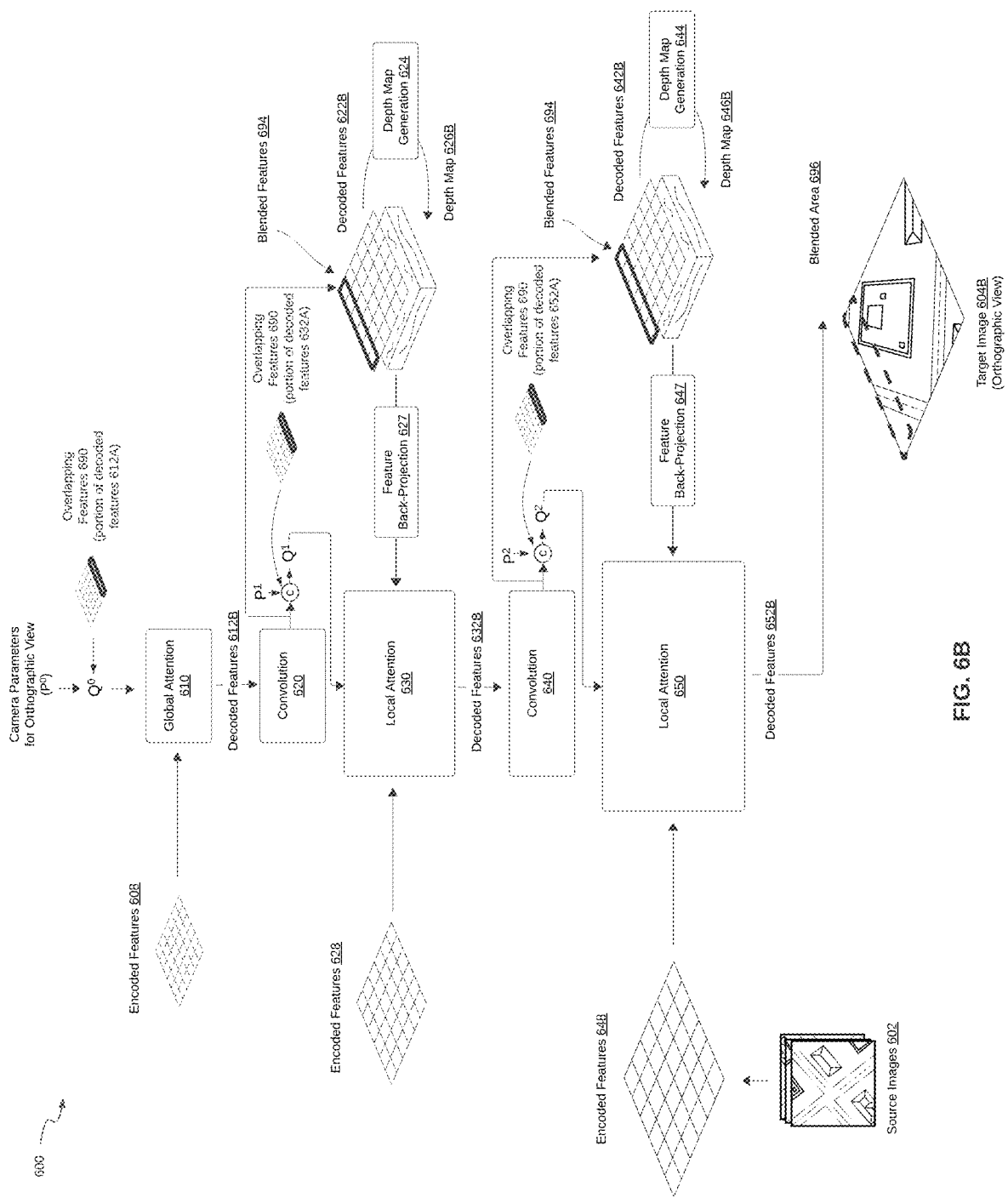
FIG. 6B illustrates the decoder generating the features for a second image patch to be used in the orthomosaic based in part on incorporating overlapping feature information from the first image patch.

FIG. 6B illustrates the same decoder 600, but in a state of generating the second image patch of the orthomosaic (indicated as target image 604B). Thus, in FIG. 6B, the decoder 600 generates decoded features 612B, 622B, 632B, 642B, 652B, and depth maps 626B, 646B to ultimately produce target image 604B, in the manner described above. The overlapping features 690 from generating the previous image patch (i.e., target image 604A) are incorporated into the queries processed by the attention layers of the decoder 600 at each step (i.e., $Q^0$, $Q^1$, and $Q^2$). Thus, the portion of the overlapping features 690 at the relevant scale are incorporated into each of the attention layers 610, 630, and 650. Furthermore, for illustrative purposes, the portions of the decoded features 622B and 642B that result from incorporating the overlapping features 690 are indicated as blended features 694.

Thus, the initial query $Q^0$ processed by the global attention layer 610 comprises not only the initial camera parameters $P^0$, but also feature information from the overlapping features 690 generated for the first image patch (i.e., a portion of decoded features 612A). It should also be noted that these overlapping features 690 are blended deeper into the second image patch by the first convolutional layer 620.

Further, the query $Q^1$ processed by local attention layer 630 comprises not only the upscaled camera parameters $P^1$, and the decoded features 622B, but also another portion of the overlapping features 690 at the next level of scale (i.e., a portion of decoded features 632A). Here also it should also be noted that these overlapping features 690 are blended deeper into the second image patch by the second convolutional layer 640.

Finally, the query $Q^2$ processed by local attention layer 650 comprises not only the upscaled camera parameters $P^2$, and the decoded features 642B, but also another portion of the overlapping features 690 at the next level of scale (i.e., a portion of decoded features 652A). The portion of the resulting target image 604B that result from incorporating the overlapping features 690 is indicated as the blended area 696.

Thus, at each level of scale, feature information from any previously-generated neighbouring image patches can be incorporated into generating the next overlapping image patch, at each level of scale, resulting in an exceptionally smooth orthomosaic.

Figure 7:
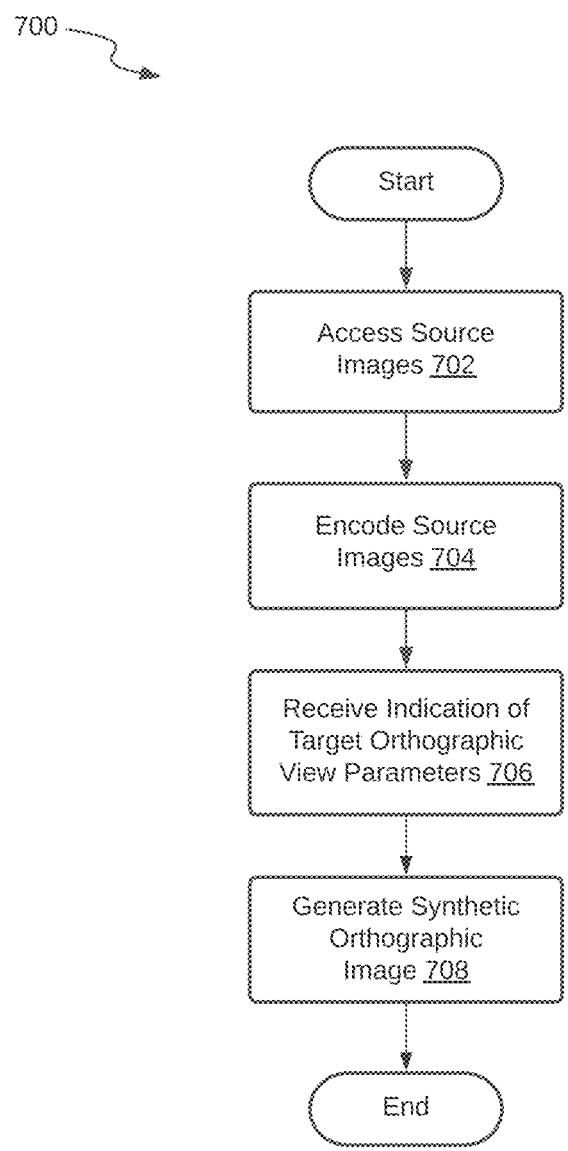
FIG. 7 is a flowchart of an example method for generating orthographic imagery through depth map-based novel view synthesis.

The methods described herein are summarized in FIG. 7, which is a flowchart of an example method 700 for generating orthographic imagery through depth map-based novel view synthesis. The steps of the method 700 may be organized into one or more functional processes (which may not necessarily be executed in the order shown) and embodied in non-transitory machine-readable programming instructions executable by one or more processors in any suitable configuration, including the computing devices of the systems described here, such as the computing devices 120 of FIG. 1.

The method 700 involves, at step 702, accessing one or more source images depicting a scene (i.e., area of interest). The source images may depict the scene from arbitrary points of view, but generally should provide at least some coverage of the scene from a substantially overhead point of view.

The method 700 further involves, at step 704, encoding the one or more source images into one or more corresponding feature maps. Encoding the source images may involve encoding each of the source images into a series of multiscale feature maps. The series of multiscale feature maps may be encoded through a series of convolutional layers.

The method 700 further involves, at step 706, receiving an indication of the parameters for a target orthographic view of the scene. The indication may comprise an embedded representation of a set of camera parameters that defines the orthographic view.

The method 700 further involves, at step 708, generating an orthographic image of the scene from the orthographic view. Generating the orthographic image of the scene may involve decoding the indication of the orthographic view and may be based at least in part on the encoded feature information derived from the source images. Further, decoding the orthographic view into the orthographic image may involve generating a depth map covering the area of interest and decoding the orthographic image with reference to the encoded features that can be projected to from points on the depth map visible through the orthographic view. This reduced set of features may be the input into a local attention mechanism that is used to determine the most relevant feature information to be drawn from the encoded source images to decode the target image. More specifically, decoding the indication of the orthographic view into the orthographic image may involve applying global attention to a set of higher-level features of the scene extracted from source images of the scene and applying local attention to a set of lower-level features of the scene extracted from source images of the scene.

Applying local attention to the second category of features may involve generating a depth map for the scene corresponding to the orthographic view and determining, with reference to the depth map, a limited set of features to be included in the local attention calculation. Determining the limited set of features to be included in the local attention calculation may involve, for each point on the depth map corresponding to a pixel to be rendered in the orthographic image, back-projecting the point through the orthographic view to determine one or more features from the encoded source images to be used to decode the pixel to be rendered.

Figure 8:
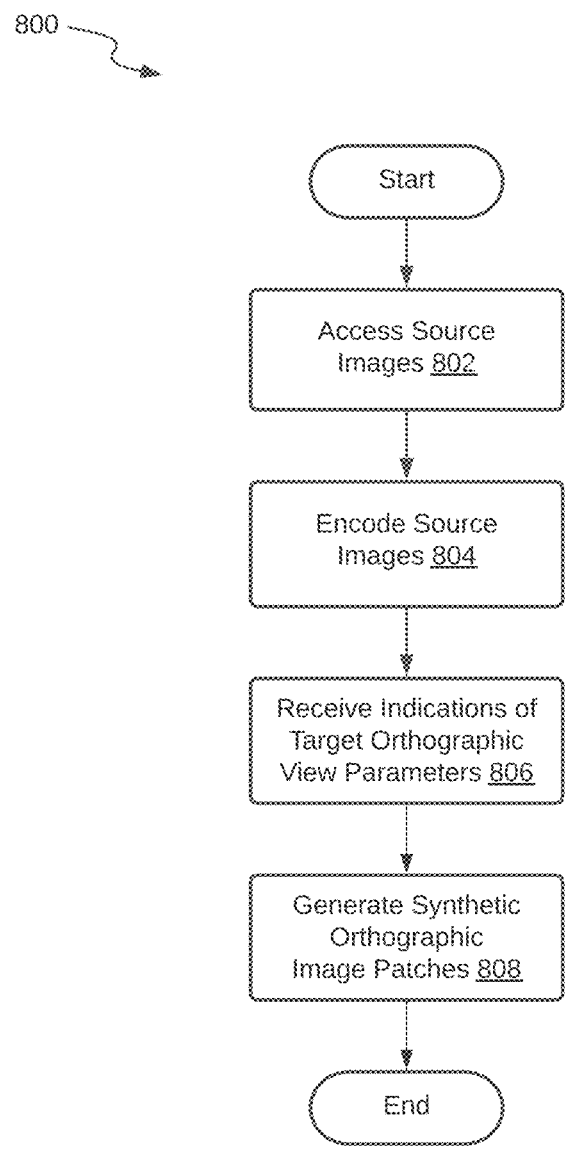
FIG. 8 is a flowchart of an example method for generating an orthomosaic through depth map-based novel view synthesis.

As also described above, this process for generating orthographic imagery can be repeated for individual image patches which can subsequently be combined together to form a larger orthomosaic. This method is summarized in FIG. 8, which is a flowchart of an example method 800 for generating an orthomosaic image through a method for depth map-based for novel view synthesis. The steps of the method 800 may be organized into one or more functional processes (which may not necessarily be executed in the order shown) and embodied in non-transitory machine-readable programming instructions executable by one or more processors in any suitable configuration, including the computing devices of the systems described here, such as the computing devices 120 of FIG. 1.

The method 800 involves, at step 802, accessing a set of source images covering an area of interest (i.e., scene). At step 804, the method 800 involves, for each source image, encoding the source image. Each source image may be encoded into a series of multiscale feature maps. At step 806, the method 800 involves receiving a set indications of orthographic view parameters. The set of orthographic views may include at least a first orthographic view and a second orthographic view, which may at least partly overlap one another. At step 808, the method 800 further involves, for each orthographic view, generating an orthographic image patch corresponding to the orthographic view through a method for depth guided novel view synthesis. Image patches may be generated sequentially until the full orthomosaic is complete. Generating the orthographic image patch for at least some of the orthographic views may involve incorporating at least some underlying feature information in an overlapping area belonging to a neighbouring image patch between the two image patches. Incorporating the underlying feature information may involve incorporating feature information across multiple scales of feature maps.

Therefore, it should be seen, as described above, that it may be advantageous to generate orthographic imagery through depth-guided novel view synthesis. The depth information that is generated inherently can effectively be leveraged as a substitute for DSMs/DTMs, obviating the need for an independent three-dimensional dataset (e.g., LiDAR data), and reducing pixel reprojection error. Such a generative approach can also have the advantage of filling in "holes" and producing an exceptionally blended orthomosaic.

It should be recognized that features and aspects of the various examples provided above can be combined into further examples that also fall within the scope of the present disclosure. The scope of the claims should not be limited by the above examples but should be given the broadest interpretation consistent with the description as a whole.

The invention claimed is:

1. A method comprising:
   accessing a plurality of source images depicting a scene from multiple points of view;
   encoding at least some of the plurality of source images each into a corresponding series of multiscale feature maps;
   receiving a definition of an orthographic projection of the scene; and
   generating an orthographic image of the scene corresponding to the orthographic projection, wherein the generating involves:
      applying global attention, based on the definition of the orthographic projection, across a set of higher-level features of the series of multiscale feature maps of at least some of the encoded source images, to produce a first set of decoded features;
      applying a convolutional and upsampling layer to the first set of decoded features to produce a second set of decoded features;
      generating a depth map for the scene corresponding to the orthographic projection of the scene based on the second set of decoded features;
      for each point on the depth map corresponding to a pixel that should be rendered in the orthographic image, back-projecting the point through the orthographic projection to determine a set of lower-level features of the series of multiscale feature maps to be used to decode the pixel; and
      applying local attention across the set of lower-level features to produce a third set of decoded features from which pixel information can be determined.

2. The method of claim 1, wherein at least one of the source images provides at least some coverage of the scene from a substantially overhead point of view.

3. The method of claim 1, wherein the definition of the orthographic projection of the scene comprises an embedded representation of a set of camera parameters corresponding to the orthographic projection.

4. The method of claim 1, further comprising combining the orthographic image with other orthographic images to generate an orthomosaic.

5. The method of claim 4, wherein combining the orthographic image with other orthographic images to generate the orthomosaic involves:
  decoding a first orthographic image patch corresponding to a first orthographic view; and
  decoding a second orthographic image patch corresponding to a second orthographic view, wherein the second orthographic image patch at least partly overlaps the first orthographic image patch, and wherein decoding the second orthographic image patch is based at least in part on feature information decoded for the first orthographic image patch, resulting in a set of blended features in at least an area in which the second orthographic image patch overlaps the first orthographic image patch.

6. The method of claim 1, wherein, for each point on the depth map corresponding to a pixel that should be rendered in the orthographic image, determining the set of lower-level features of the multiscale feature maps to be used to decode the pixel comprises:
  determining an intersected feature on the set of lower-level features to which the point is back-projected; and
  selecting the intersected feature and a set of surrounding features to be the set of lower-level features to be used to decode the pixel.

7. The method of claim 1, wherein the generating further comprises:
  iteratively generating depth maps of progressively finer scale, each depth map based on a previous set of decoded features; and
  iteratively applying local attention, each local attention based on a previously generated depth map, to determine progressively finer detailed decoded feature information from which pixel information can be determined, until a final decoded feature map from which the pixel information is to be determined is reached.

8. A system comprising one or more computing devices configured to:
  access a plurality of source images depicting a scene from multiple points of view;
  encode at least some of the plurality of source images each into a corresponding series of multiscale feature maps;
  receive a definition of an orthographic projection of the scene; and
  generate an orthographic image of the scene corresponding to the orthographic projection, wherein the generating involves:
    applying global attention, based on the definition of the orthographic projection, across a set of higher-level features of the series of multiscale feature maps of at least some of the encoded source images, to produce a first set of decoded features;
    applying a convolutional and upsampling layer to the first set of decoded features to produce a second set of decoded features;
    generating a depth map for the scene corresponding to the orthographic projection of the scene based on the second set of decoded features;
    for each point on the depth map corresponding to a pixel that should be rendered in the orthographic image, back-projecting the point through the orthographic projection to determine a set of lower-level features of the series of multiscale feature maps to be used to decode the pixel; and
    applying local attention across the set of lower-level features to produce a third set of decoded features from which pixel information can be determined.

9. The system of claim 8, wherein at least one of the source images provides at least some coverage of the scene from a substantially overhead point of view.

10. The system of claim 8, wherein the definition of the orthographic projection of the scene comprises an embedded representation of a set of camera parameters corresponding to the orthographic projection.

11. The system of claim 8, wherein the one or more computing devices are configured, for each point on the depth map corresponding to a pixel that should be rendered in the orthographic image, to determine the set of lower-level features of the multiscale feature maps to be used to decode the pixel by:
  determining an intersected feature on the set of lower-level features to which the point is back-projected; and
  selecting the intersected feature and a set of surrounding features to be the set of lower-level features to be used to decode the pixel.

12. The system of claim 8, wherein the one or more computing devices are further configured to generate the orthographic image by:
  iteratively generate depth maps of progressively finer scale, each depth map based on a previous set of decoded features; and
  iteratively apply local attention, each local attention based on a previously generated depth map, to determine progressively finer detailed decoded feature information from which pixel information can be determined, until a final decoded feature map from which the pixel information is to be determined is reached.

13. At least one non-transitory machine-readable storage medium comprising instructions that when executed cause one or more processors to:
  access a plurality of source images depicting a scene from multiple points of view;
  encode at least some of the plurality of source images each into a corresponding series of feature maps;
  receive a definition of an orthographic projection of the scene; and
  generate an orthographic image of the scene corresponding to the orthographic projection, wherein the generating involves:
    applying global attention, based on the definition of the orthographic projection, across a set of higher-level features of the series of multiscale feature maps of at least some of the encoded source images, to produce a first set of decoded features;
    applying a convolutional and upsampling layer to the first set of decoded features to produce a second set of decoded features;
    generating a depth map for the scene corresponding to the orthographic projection of the scene based on the second set of decoded features;
    for each point on the depth map corresponding to a pixel that should be rendered in the orthographic image, back-projecting the point through the orthographic projection to determine a set of lower-level features of the series of multiscale feature maps to be used to decode the pixel; and
    applying local attention across the set of lower-level features to produce a third set of decoded features from which pixel information can be determined.

14. The at least one non-transitory machine-readable storage medium of claim 13, wherein at least one of the source images provides at least some coverage of the scene from a substantially overhead point of view.

15. The at least one non-transitory machine-readable storage medium of claim 13, wherein the definition of the orthographic projection of the scene comprises an embedded representation of a set of camera parameters corresponding to the orthographic projection.

16. The at least one non-transitory machine-readable storage medium of claim 13, wherein the instructions when executed further cause the one or more processors, for each point on the depth map corresponding to a pixel that should be rendered in the orthographic image, to determine the set of lower-level features of the multiscale feature maps to be used to decode the pixel by:
    determining an intersected feature on the set of lower-level features to which the point is back-projected; and
    selecting the intersected feature and a set of surrounding features to be the set of lower-level features to be used to decode the pixel.

17. The at least one non-transitory machine-readable storage medium of claim 13, wherein the instructions when executed further cause the one or more processors to:
    prior to generating the depth map for the scene, apply a convolutional and upsampling layer to the first set of decoded features to produce a fused feature map, wherein the depth map is generated based on the fused feature map.

18. The at least one non-transitory machine-readable storage medium of claim 13, wherein the instructions when executed further cause the one or more processors to generate the orthographic image by: iteratively generate depth maps of progressively finer scale, each depth map based on a previous set of decoded features; and iteratively apply local attention, each local attention based on a previously generated depth map, to determine progressively finer detailed decoded feature information from which pixel information can be determined, until a final decoded feature map from which the pixel information is to be determined is reached.

* * * * *